(12) United States Patent
Tanabe et al.

(10) Patent No.: US 6,585,236 B2
(45) Date of Patent: Jul. 1, 2003

(54) AERATOR

(75) Inventors: Seiichi Tanabe, Amagasaki (JP);
Kosuke Ode, Amagasaki (JP); Tomoya Okamura, Amagasaki (JP)

(73) Assignee: Hitachi Kiden Kogyo, Ltd., Hyougo (JP)

( * ) Notice: Subject to any disclaimer, the term of this patent is extended or adjusted under 35 U.S.C. 154(b) by 41 days.

(21) Appl. No.: 10/038,900

(22) Filed: Jan. 8, 2002

(65) Prior Publication Data

US 2003/0011082 A1 Jan. 16, 2003

(30) Foreign Application Priority Data

Jul. 16, 2001 (JP) .......................................... 2001-215485

(51) Int. Cl.[7] .................................................. B01F 3/04
(52) U.S. Cl. ........................................ 261/91; 261/36.1
(58) Field of Search ........................... 261/36.1, 29, 84, 261/91, DIG. 71

(56) References Cited

U.S. PATENT DOCUMENTS

| | | | | |
|---|---|---|---|---|
| 2,072,944 A | * | 3/1937 | Durdin, III | |
| 3,780,998 A | * | 12/1973 | Botsch | |
| 3,911,065 A | * | 10/1975 | Martin et al. | |
| 4,145,383 A | * | 3/1979 | Randall | |
| 4,193,951 A | * | 3/1980 | Stanley | |
| 4,540,528 A | * | 9/1985 | Haegeman | |
| 5,021,154 A | * | 6/1991 | Haegeman | |

* cited by examiner

*Primary Examiner*—C. Scott Bushey
(74) *Attorney, Agent, or Firm*—Wenderoth, Lind & Ponack, L.L.P.

(57) ABSTRACT

The objective of the present invention is to provide an aerator capable of performing aerobic operation feeding air into water, and anaerobic operation not feeding air into water efficiently, by simply switching the direction of rotation of an electric motor, without installing any lifting mechanism for lifting a rotary shaft provided with agitating blade. For that purpose, on an aerator provided with agitating blade mounted on a rotary shaft driven by an electric motor, and a cylindrical body disposed in a way to cover the area surrounding said rotary shaft, the cylindrical body is disposed from under the water surface to above the water surface, and the agitating blade is disposed by being split into upper agitating blade for sucking the waste water fed into the cylindrical body, during an aerobic operation, and lower agitating blade for feeding waste water into the cylindrical body, during an aerobic operation, and performing agitation by producing water current in the waste water, during an anaerobic operation.

9 Claims, 8 Drawing Sheets

FIG. 3 (A)   FIG. 3 (B)
FIG. 3 (C)
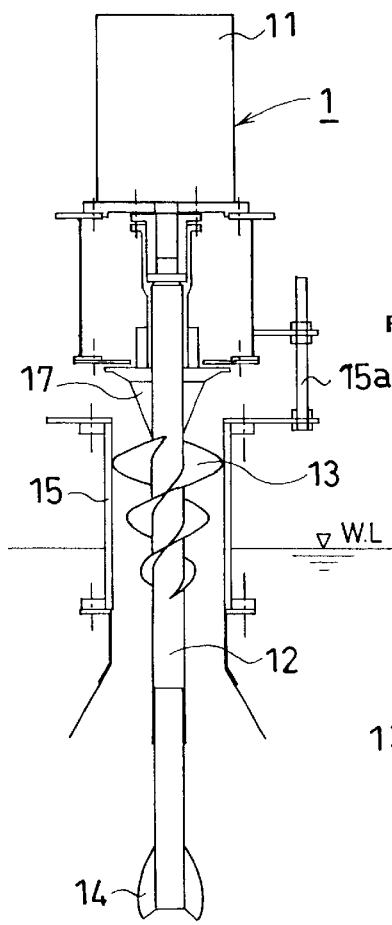
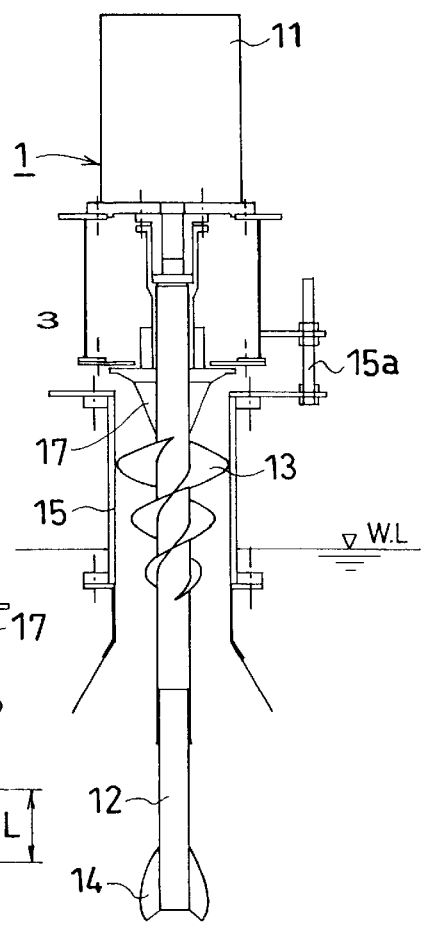
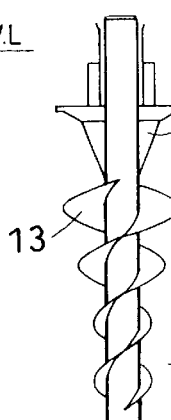
FIG. 3 (D)   FIG. 3 (E)
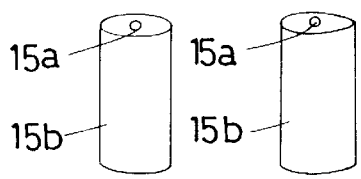

AERATOR

BACKGROUND OF THE INVENTION

The present invention concerns an aerator, more specifically an aerator capable of performing aerobic operation (aerating operation) feeding air (oxygen) into water, and anaerobic operation (agitating operation) not feeding air (oxygen) into water efficiently, by simply switching the direction of rotation of an electric motor.

Conventionally, when treating waste water by alternately switching between aerobic operation feeding air into water and anaerobic operation not feeding air into water, it was customary to install an aerator near the water surface in the sewage treating tank, and make a rotary shaft, rotatively driven by an electric motor, go up and turn in one direction to suck and splash waste water in the surrounding area like a fountain so as to perform aeration by feeding air into the water with the falling of the waste water, during an aerobic operation, but make the rotary shaft go down and turn in the opposite direction to perform agitation by producing water current in the waste water, during an anaerobic operation.

By the way, a problem with the above-described conventional aerator was that the aerator becomes complicated in structure, because, when switching between aerobic operation and anaerobic operation, it requires a lifting mechanism for lifting a rotary shaft provided with agitating blade, to suck and splash waste water in the surrounding area like a fountain, during an aerobic operation, while, on the other hand, producing water current in the waste water, during an anaerobic operation, in addition to switching the direction of rotation of the rotary shaft rotatively driven by an electric motor.

SUMMARY OF THE INVENTION

In view of said problems with conventional aerators, the objective of the present invention is to provide an aerator capable of efficiently performing both the aerobic operation of feeding air into water and the anaerobic operation of not feeding air into water, by simply switching the direction of the rotation of an electric motor, without installing any lifting mechanism to lift a rotary shaft provided with an agitating blade.

To achieve said objective, the aerator according to the present invention is an aerator provided with an agitating blade mounted on a rotary shaft driven by an electric motor, and a cylindrical body disposed in such a way to cover the area surrounding said rotary shaft, characterized in that said cylindrical body is disposed both under and above the water's surface, and that said agitating blade is disposed by being split into an upper agitating blade for sucking up the waste water fed into the cylindrical body during an aerobic operation, and a lower agitating blade for feeding waste water into the cylindrical body during an aerobic operation, and performing agitation by producing water current in the waste water during an anaerobic operation.

This aerator, realized in such a way that a cylindrical body disposed in a way to cover the area surrounding the rotary shaft is disposed both under and above the water's and that the agitating blade is disposed by being split into an upper agitating blade for sucking up the waste water fed into the cylindrical body during an aerobic operation, and a lower agitating blade for feeding waste water into the cylindrical body during an aerobic operation, and performing agitation by producing water current in the waste water during an anaerobic operation, feeds waste water into the cylindrical body using the upper agitating blade, by turning the rotary shaft driven by an electric motor in one direction at the start of an aerobic operation, and also sucks and splashes the waste water fed into the cylindrical body like a fountain in the surrounding area continuously thereafter, to feed air into the water so as to perform the aerobic operation of aeration during agitation, while on the other hand, producing water current in the waste water with the lower agitating blade, by turning the rotary shaft in the opposite direction during an anaerobic operation.

During this anaerobic operation, the upper agitating blade turns idly in the cylindrical body, preventing bad influences in the anaerobic operation.

In this case, said upper agitating blade may be formed in the shape of a spiral, tapered in diameter from the top toward the lower part.

This makes it possible to accurately suck up the waste water fed into the cylindrical body during an aerobic operation, and accurately prevent bad influences in anaerobic operation.

In this case, the lower part of the upper agitating blade formed in the shape of a spiral tapered in diameter from the top toward the lower part may be formed with a uniform diameter over a prescribed length in the axial direction.

This makes it possible to accurately suck up the waste water fed into the cylindrical body during an aerobic operation, without being influenced by water level fluctuations in the sewage treating tank, and more accurately prevent bad influences in anaerobic operation.

Moreover, an intermediate agitating blade may be disposed between the upper agitating blade and the lower agitating blade.

This makes it possible, during an aerobic operation, to smoothly perform the auxiliary action of feeding waste water into the cylindrical body, by means of an intermediate agitating blade.

Furthermore, the outer edge of the upper agitating blade may be formed by being bent in the direction of the rotary shaft's rotation.

This eliminates any flow elements moving outward from the outer edge of the blade, and makes it possible to prevent the catching of impurities between the blades and the cylindrical body without reducing aerating performance, because there is no increase of water leakage from the outer edge of the blade even if you increase the gap between the blade and the cylindrical body.

Yet more, the bottom end of the rotary shaft may protrude downward from the lower agitating blade, the bottom end face being formed in the shape of an arched face.

This makes it possible, during reverse rotation of the lower agitating blade, to guide the flow of the water current, sucked upward from the bottom of the tank, smoothly toward the lower agitating blade, through the tip formed in the shape of an arched face of the shaft extending downward from the lower agitating blade, and then turn it into a current flowing upward while being agitated.

Moreover, the lower fastening plate supporting the cylindrical body and the upper fastening guide disposed above the conical guide may be connected to each other, through a stay having a blade-shaped or oval section.

This makes it possible, when waste water splashes through the gap between the lower fastening plate supporting the cylindrical body and the upper fastening guide, to extend the splashing distance, because the resistance of the splashed water can be controlled to be low with the stay having a blade-shaped or oval section.

Furthermore, the mounting angle of the stay may be adjustable.

This makes it possible to easily adjust the diffusion of waste water, depending on the shape of the tank.

Still more, the electric motor may be arranged in such a way to increase its speed at the starting time only.

This makes it possible to quickly produce an upward water current at the starting time, to stabilize the diffusion and splashing of waste water.

BRIEF DESCRIPTION OF THE DRAWINGS

FIG. 3 is an expanded view of the aerator.

DETAILED DESCRIPTION OF THE INVENTION

Embodiments of the aerator according to the present invention will be explained below based on drawings.

Figure 1:
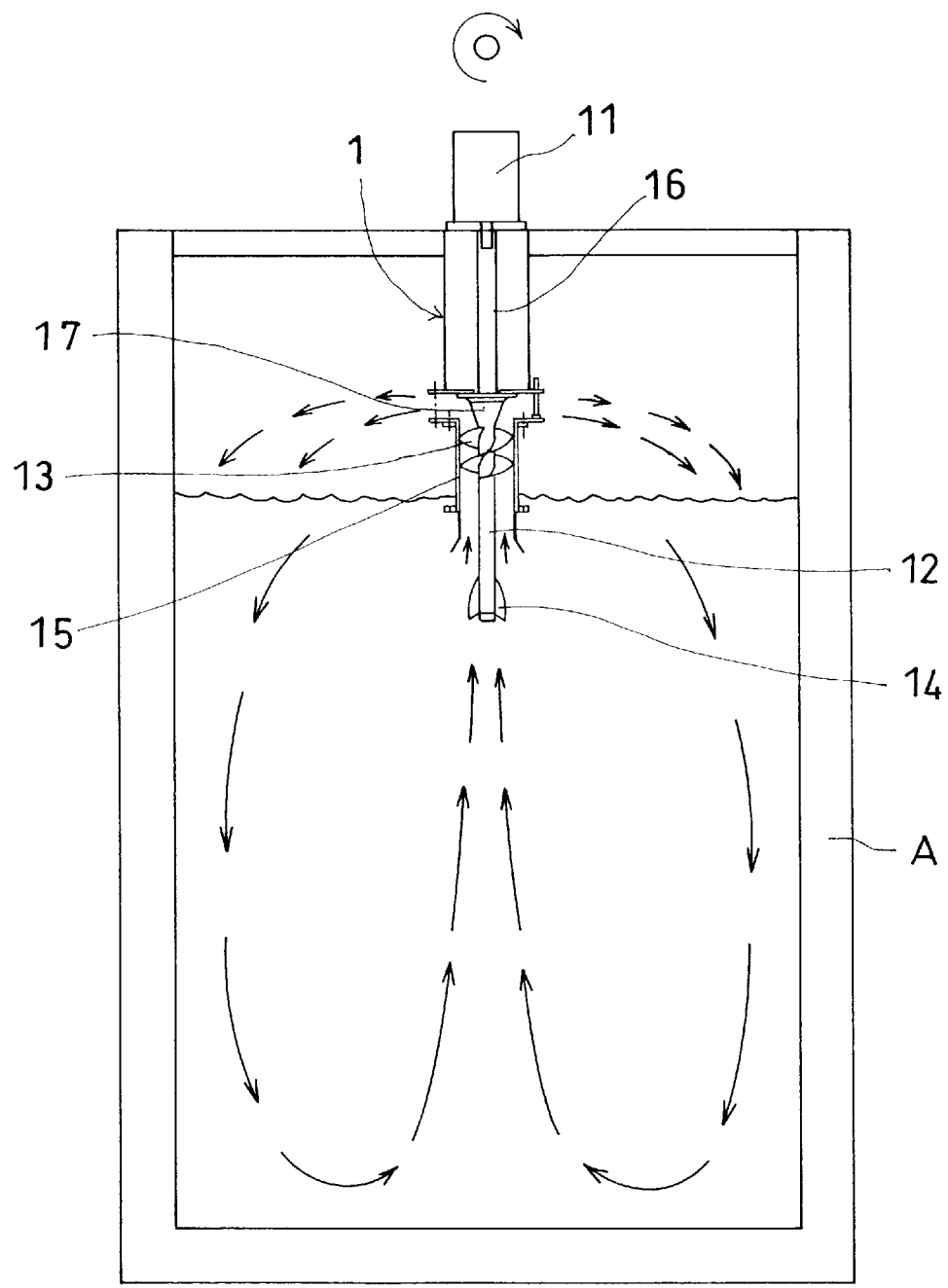
FIG. 1 is a sectional view showing a state of aerobic operation in the first embodiment of the aerator according to the present invention.
Figure 2:
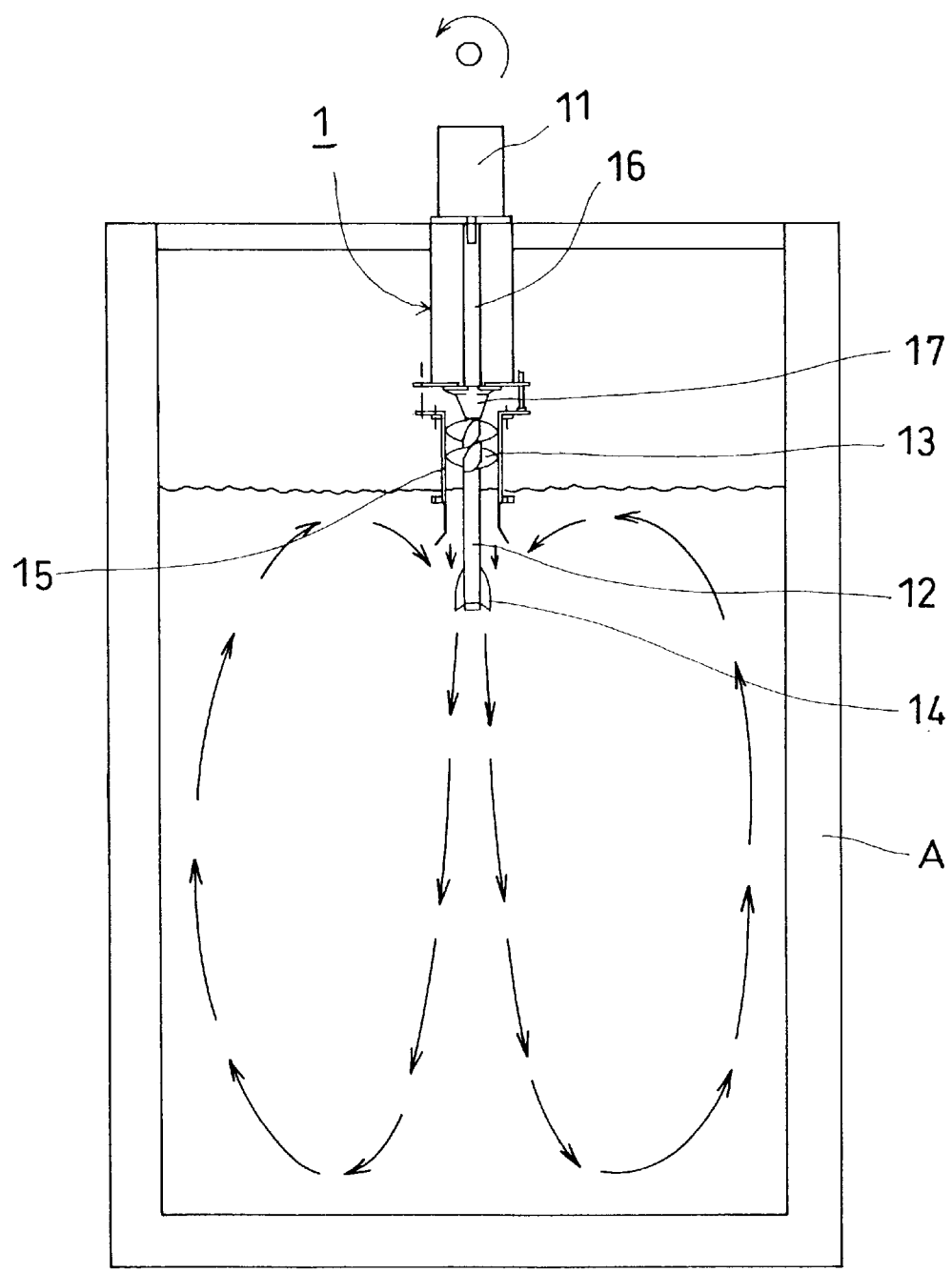
FIG. 2 is a sectional view showing a state of anaerobic operation in above.

FIG. 1 to FIG. 3 show the first embodiment of the aerator according to the present invention.

FIG. 1 indicates a state of aerobic operation and FIG. 2 indicates a state of anaerobic operation, made by installing the aerator 1 in a sewage treating tank in rectangular shape, respectively.

By the way, the sewage treating tank A in which is installed this aerator 1 is not particularly limitative but is one which is in rectangular shape and has a prescribed capacity generally used for treating waste water, and the aerator 1 is installed at the center of the sewage treating tank A.

The aerator 1 is installed in the sewage treating tank A by being fastened to the latter through a frame, etc., to thereby enable to aerate and agitate the waste water uniformly in the entire part of the sewage treating tank A.

Figure 4:
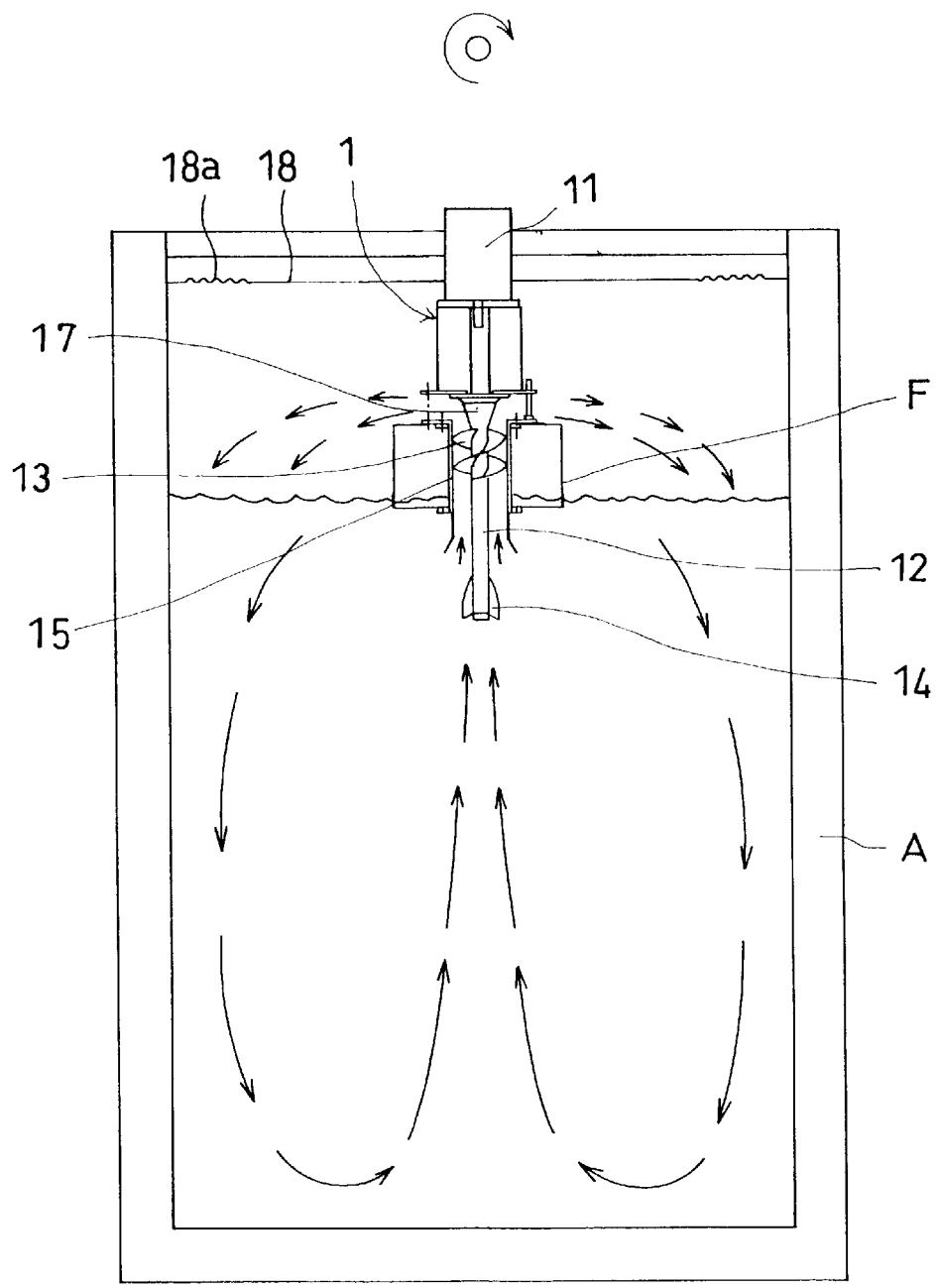
FIG. 4 is a sectional view showing a modified embodiment of the first embodiment of the aerator according to the present invention.

In the case where the aerator 1 is supported in a floating state with a float F, as shown in the modified embodiment given in FIG. 4, it will be installed by restricting rotation by means of a wire 18, etc. provided with a spring 18a, so that it may cope with fluctuations of water level.

On the aerator 1, a rotary shaft 12 having a length reaching prescribed depth under the water will be connected vertically, to the bottom end of the drive shaft 16 of the electric motor 11 switchable in direction of rotation installed on the surface of the water.

And, a cylindrical body 15 in cylindrical shape covering the area surrounding this rotary shaft 12 at prescribed intervals will be disposed from under the water surface to above the water surface.

The top end of this cylindrical body 15 in cylindrical shape is disposed by keeping a prescribed space against the portion above water surface of the aerator 1, to enable to splash waste water in the surrounding area, while the bottom end of the cylindrical body 15 is formed in a way to slightly open straight or in the shape of a funnel as illustrated.

Moreover, as shown in FIG. 3, between the electric motor 11 and the cylindrical body 15 will be disposed an adjusting mechanism 15a for adjusting the relative position in axial direction of the electric motor 11 (drive shaft 16) and the cylindrical body 15, i.e. the installed position (depth in water) of the cylindrical body 15, to thereby adjust the installed position (depth in water) of the cylindrical body 15, depending on the level of waste water in the sewage treating tank A and aerobic operation or anaerobic operation.

To prevent entanglement of fibrous materials such as hair, etc. contained in the waste water to the adjusting mechanism 15a, when waste water is splashed in the surrounding area from to the top end of the cylindrical body 15, it is desirable to dispose a cover 15b formed with a section in oval or streamline shape, as shown in FIG. 3(D) or FIG. 3(E), on the outer circumference of the bar-shaped body constituting the adjusting mechanism 15a.

Furthermore, on the rotary shaft 12, 2 kinds of agitating blade 13, 14 will be disposed by being split into upper agitating blade 13, at least the greater part of which is positioned above water surface in the cylindrical body 15 (it may also be disposed in such a way that its entire part is positioned above water surface in the cylindrical body 15), for sucking waste water fed into the cylindrical body 15, during an aerobic operation, and lower agitating blade 14 positioned under water surface below the bottom end of the cylindrical body 15, for feeding waste water into the cylindrical body 15, during an aerobic operation, and performing agitation by producing water current in the waste water, during an anaerobic operation, and at their top end is formed an inverted conical portion 17, so that the waste water may be splashed in the surrounding area.

In that case, the agitating blades 13, 14 may be realized in one same structure or different structures, if only they can produce water current, and their structure is not limited to the illustrated one.

And, by disposing the agitating blades 13, 14 by splitting them into upper agitating blade 13, at least the greater part of which is positioned above water surface in the cylindrical body 15, for sucking waste water fed into the cylindrical body 15, during an aerobic operation, and lower agitating blade 14 positioned under water surface below the bottom end of the cylindrical body 15, for feeding waste water into the cylindrical body 15, during an aerobic operation, and performing agitation by producing water current in the waste water, during an anaerobic operation, it becomes easy to realize them in different structures.

To be concrete, by adopting, for the upper agitating blade 13, at least the greater part of which is positioned above water surface in the cylindrical body 15, for sucking waste water fed into the cylindrical body 15, during an aerobic operation, one with a structure formed in spiral shape, it becomes possible to suck the waste water fed into the cylindrical body 15 accurately, during an aerobic operation, for example.

And, for this upper agitating blade 13 of a structure formed in spiral shape, one of a structure formed in spiral shape with a diameter uniform in axial direction may be adopted, but by adopting especially one of a structure formed in spiral shape with a diameter reduced from the top toward the lower part, as illustrated in FIG. 3, it becomes possible to prevent bad influences on the anaerobic operation even with fluctuations of water level, etc., while sucking the waste water fed into the cylindrical body 15 accurately, during an aerobic operation. Namely, even if the level of waste water in the cylindrical body 15 goes up and the waste water gets in contact with the upper agitating blade 13, during an anaerobic operation, the waste water in the cylindrical body 15 is mainly subject to a force in outer circumferential direction of the cylindrical body 15, and the fluctuations of level in up-down direction of the waste water in the cylindrical body 15 can be controlled, because the upper agitating blade 13 in this part is small in diameter, thus enabling stable anaerobic operation with comparatively small vibrations, etc.

Still more, by forming the lower part of the upper agitating blade 13 formed in the shape of a spiral reduced in diameter from the top toward the lower part with a uniform diameter over a prescribed length L in the axial direction, as shown in FIG. 3(C), it becomes possible to absorb, in this range, fluctuations of water level in the sewage treating tank A, and to suck the waste water fed into the cylindrical body 15 accurately, during an aerobic operation, without being influenced by fluctuations of water level in the sewage treating tank A, and avoid bad influences on anaerobic operation more accurately.

Yet more, by adopting, for the lower agitating blade 14 positioned under water surface below the bottom end of the cylindrical body 15, for feeding waste water into the cylindrical body 15, during an aerobic operation, and performing agitation by producing water current in the waste water, during an anaerobic operation, one of a structure not allowing the current to spread in the circumferential direction, it becomes possible to produce bottom water currents having a sufficient flow velocity, with the lower agitating blade 14 positioned near the water surface, even in the case of a sewage treating tank of large depth, and to also shorten the equipment length of the aerator 1, thus enabling to lift the aerator 1 easily on the water surface on the occasion of a maintenance work.

Figure 5:
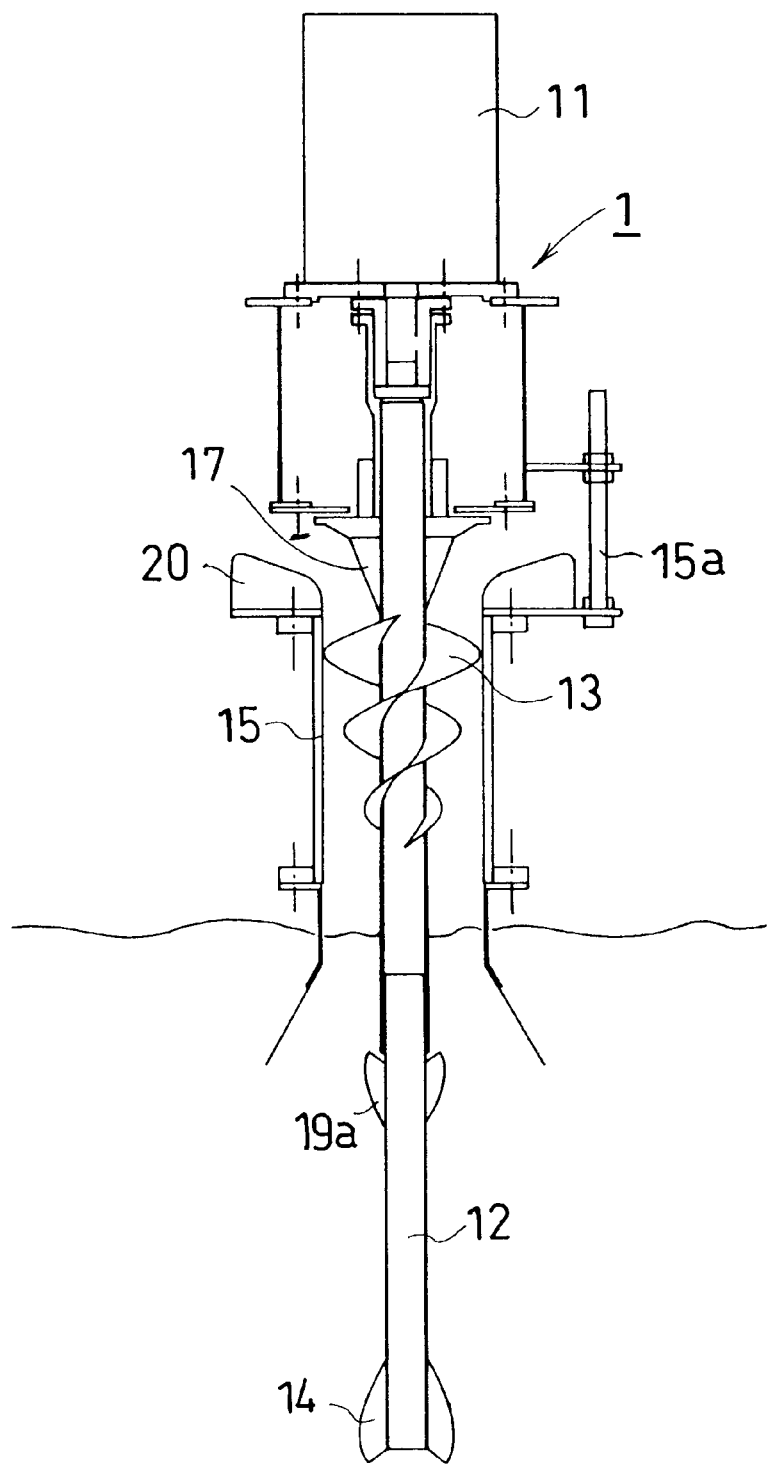
FIG. 5 is a sectional view showing the second embodiment of the aerator according to the present invention.
Figure 6:
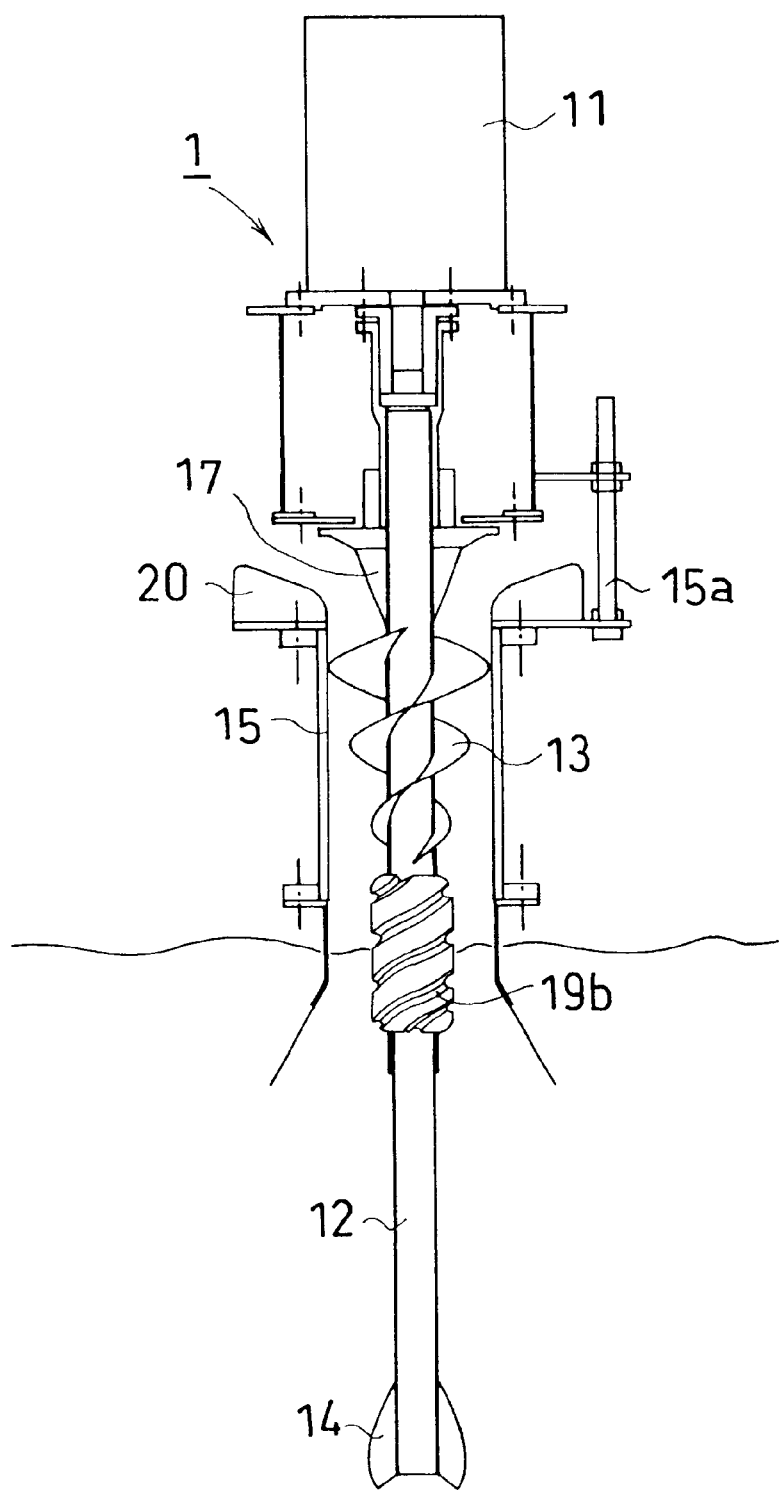
FIG. 6 is a sectional view showing a modified embodiment of the aerator according to the present invention.

Moreover, as in modified embodiments in FIG. 5 and FIG. 6, an intermediate agitating blade 19a or an intermediate agitating blade 19b may be disposed between the upper agitating blade 13 and the lower agitating blade 14.

The structure of these intermediate agitating blades 19a, 19b is not particularly restricted, but the one indicated in FIG. 5 is realized in such a way that the intermediate agitating blade 19a of a shape similar (but small in size) to that of the lower agitating blade 14 is disposed to be positioned under the water in the direction opposite to the lower agitating blade 14, while the one indicated in FIG. 6 is so constructed that the intermediate agitating blade 19b forming a spiral rib in the shape of a ball screw is disposed to be positioned ranging from above the water surface to under the water.

In this way, by disposing intermediate agitating blades 19a, 19b between the upper agitating blade 13 and the lower agitating blade 14, it becomes possible, during an aerobic operation, to perform an auxiliary action for feeding the waste water into the cylindrical body 15 smoothly, by means of the intermediate agitating blades 19a, 19b. In addition, since these intermediate agitating blades 19a, 19b are both small in size and have only a small rotating resistance, bad influences during an anaerobic operation can be controlled low. And, especially, the intermediate agitating blade 19b forming a spiral rib in the shape of a ball screw indicated in FIG. 6 can lessen maintenance work of the aerator 1, because it is well protected against entanglement of fibrous materials such as hair, etc. contained in the waste water.

Furthermore, in modified embodiments indicated in FIG. 5 and FIG. 6, at the top end of the rotary shaft 12 is formed an inverted conical portion 17, so that the waste water may be splashed uniformly in the surrounding area, and at the top end of the cylindrical body 15 is disposed a straightening block 20 in the shape of a doughnut formed in conical face slightly depressed at the center on the top face.

Next, explanation will be given on the actions of this aerator 1.

In the first place, at the start of an aerobic operation, waste water is fed into the cylindrical body 15, with the lower agitating blade 14 positioned under the water below the bottom end of the cylindrical body 15, as the rotary shaft 12, rotatively driven by the electric motor 11, turns in one direction, as shown in FIG. 1, and the waste water fed into the cylindrical body 15 is sucked by the upper agitating blade 13, at least the greater part of which is positioned above water surface in the cylindrical body 15, making it possible to splash the waste water in the surrounding area continuously thereafter and perform aerobic operation by aeration by introducing air into the water through contact of waste water with air by splashing of water drops and falling of waste water.

Still more, in combination with above, an upward water current is produced, at the center of the sewage treating tank A, by the lower agitating blade 14 positioned under the water below the bottom end of the cylindrical body 15, and this upward water current produces a circulating water current in the sewage treating tank A, enabling agitation in the entire part of the sewage treating tank A.

In the initial period of rotation of the rotary shaft 12, while the upper agitating blade 13, at least the greater part of which is positioned above water surface in the cylindrical body 15, makes idle turns in the cylindrical body 15, the waste water fed into the cylindrical body 15, with the lower agitating blade 14 positioned under the water below the bottom end of the cylindrical body 15, can be sucked with the upper agitating blade 13, as the cylindrical body 15 is filled with waste water fed into it.

On the other hand, during an anaerobic operation, a downward water current is produced, at the center of the sewage treating tank A, by the lower agitating blade 14 positioned under the water below the bottom end of the cylindrical body 15, as the rotary shaft 12, rotatively driven by the electric motor 11, turns in reverse direction, as shown in FIG. 2, and this downward water current produces a circulating water current in the sewage treating tank A, enabling agitation in the entire part of the sewage treating tank A.

During this anaerobic operation, the upper agitating blade 13, at least the greater part of which is positioned above water surface in the cylindrical body 15, makes idle turns in the cylindrical body 15, without having any bad influences on the anaerobic operation.

And, this aerator 1 further has the following advantages:

(1) Generally the motive power required per unit water volume in the sewage treating tank shall preferably be set larger during an aerobic operation than that during an anaerobic operation.

On this aerator 1, designed in such a way that the upper agitating blade 13, at least the greater part of which is positioned above water surface in the cylindrical body 15, makes idle turns, the motive power during an anaerobic operation can be made smaller than that during an aerobic operation and, therefore, no control as that by conventional control system is required, thus enabling simplification of the equipment construction.

(2) With this aerator 1, sufficient bottom water currents can be produced, with the lower agitating blade 14 positioned under the water below the bottom end of the cylindrical body 15.

Especially, with this aerator 1, the upper agitating blade 13, at least the greater part of which is positioned above water surface in the cylindrical body 15, makes idle turns in the cylindrical body 15, during an anaerobic operation, improving energy efficiency and making it possible to produce sufficient bottom water currents with a small motive power.

(3) Usually, in the case where water currents are produced, during an aerobic operation, at the bottom of the sewage treating tank by sucking waste water upwardly from around the water surface, by means of an agitating blade disposed near the water surface, a large motive power is required for producing bottom water currents having a sufficient flow velocity.

On the other hand, with this aerator 1, no large motive power is required for producing bottom water currents having a sufficient flow velocity, because it is possible to produce water currents at the bottom of the sewage treating tank A by means of 2 kinds of agitating blade 13, 14, at least the greater part of which are disposed separately at a position above water surface in the cylindrical body 15 and a position under the water below the bottom end of the cylindrical body 15.

The motive power required at this time is larger compared with that required during an anaerobic operation, but this is a motive power required for aeration satisfying the necessary oxygen dissolution speed, and no motive power is wasted for producing bottom water currents.

(4) During an aerobic operation, it is possible to feed waste water of low oxygen content near the bottom of the sewage treating tank A, with the lower agitating blade 14, into the cylindrical body 15, suck the waste water fed into the cylindrical body 15, with the upper agitating blade 13, and perform aeration continuously thereafter by splashing the waste water like a fountain in the surrounding area to feed air into the water, and also perform circulation of waste water at the bottom of the sewage treating tank A in rectangular shape, with pushing down of waste water near the wall face under the falling pressure of the splashed waste water, namely suck water of low oxygen content near the bottom of the sewage treating tank and make aeration, thus improving the oxygen dissolution efficiency (oxygen dissolution speed efficiency) per unit motive power.

Figure 7:
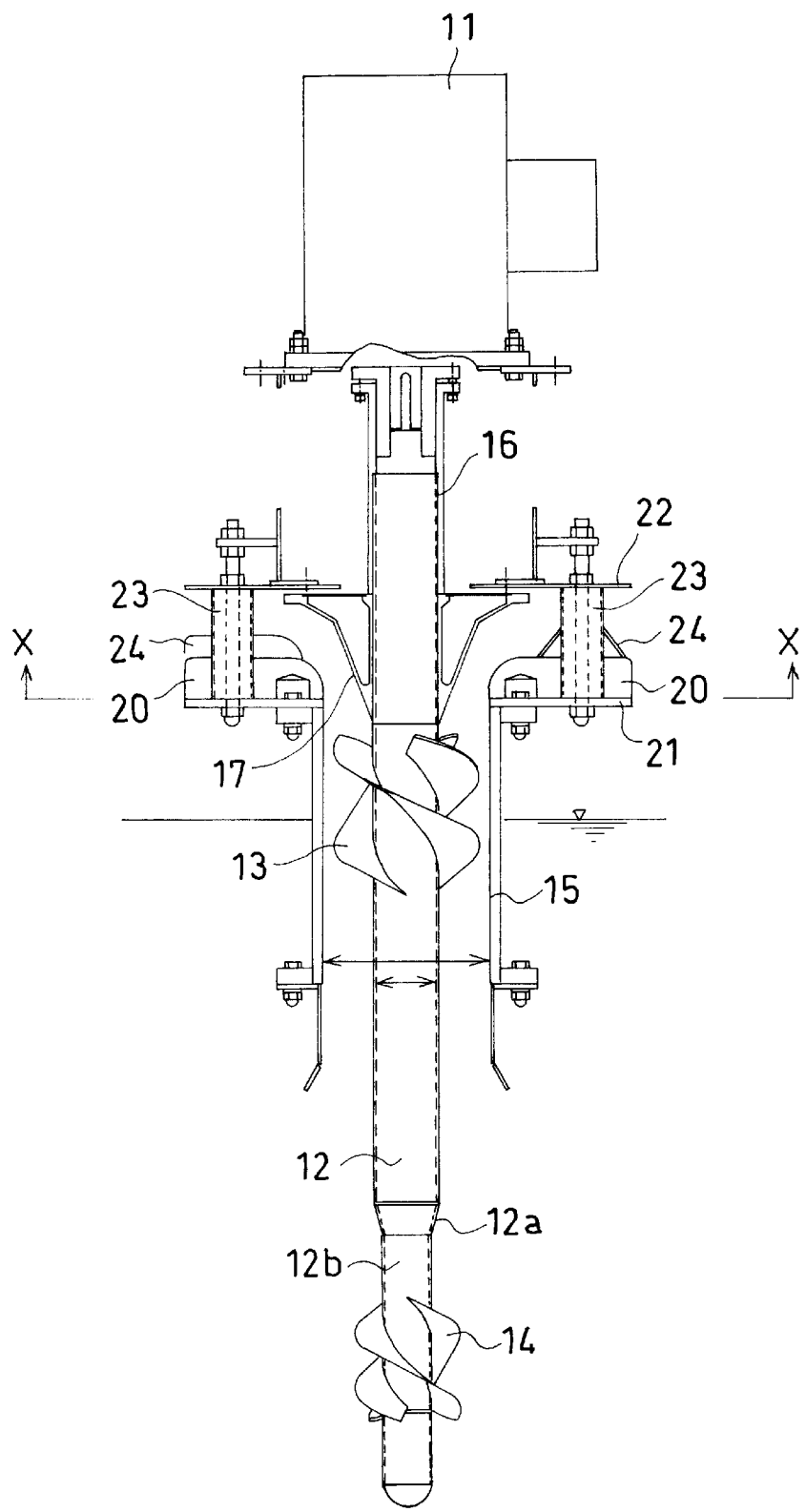
FIG. 7 is a sectional view showing a modified embodiment of the aerator according to the present invention.
Figure 8:
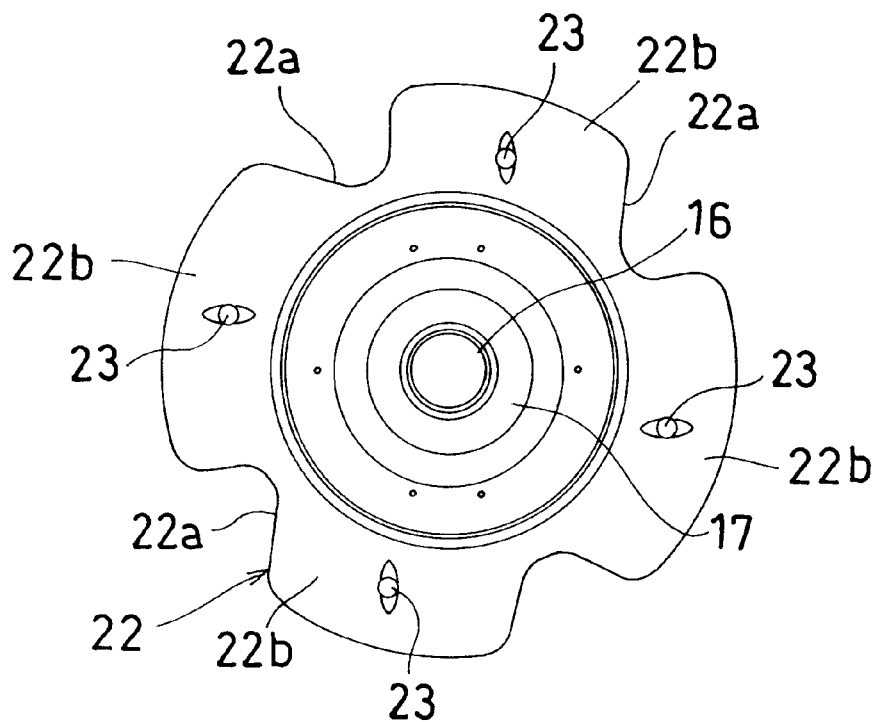
FIG. 8 is a transverse plan view by line X—X of FIG. 7.

Next, FIG. 7 and FIG. 8 indicate the second embodiment of the aerator according to the present invention.

In this embodiment, the construction realized in a way to drive a rotary shaft 12, passing through the cylindrical body 15 and provided with 2 agitating blades 13, 14 split into upper and lower portions, with an electric motor 11 remains the same as in the first embodiment, and the rotary shaft 12 forms a tapered step 12a, at the position protruding from the bottom end of the cylindrical body 15, in such a way that the shaft diameter changes, or gets smaller toward the bottom side, for example, at a position higher than the lower agitating blade 14, that the small-diameter shaft part 12b of this rotary shaft 12 is made to protrude downward from the bottom end of the lower agitating blade 14, and that the bottom end face takes the shape of an arched face.

This makes it possible, during reverse rotation of the 2 agitating blades 13, 14, to agitate the flow of the water current, sucked up from the direction of bottom of the tank, smoothly with the lower agitating blade 14 through the small-diameter shaft part 12b, the tip of which is extended downward to below the lower agitating blade 14, and turn it into an upward current at the same time, and also introduce it into the cylindrical body 15, by making it go up along the rotary shaft 12, while diffusing it smoothly from the small-diameter shaft part 12b toward the outer circumferential direction of the rotary shaft 12 at the top by means of the tapered step 12a in different diameters.

Moreover, the cylindrical body 15 may be fastened in a detachable and replaceable way by bolting, etc. against the lower mounting plate 21 fixed to the body side of the aerator 1. This makes it possible to change the diameter ratio of the cylindrical body 15 to the rotary shaft 12, by preparing a plurality of kinds of cylindrical body 15 in different diameters and using one selected from among them as desired, and use them at optimal diameter ratio depending on the type of sewage treating tank A and the state of splashing of waste waster, etc., to thereby improve agitation of waste water in the cylindrical body 15, upward flow velocity, etc.

Furthermore, the conical guide 17 fastened to the rotary shaft 12, above the cylindrical body 15, in a way to be positioned over the upper agitating blade 13 is disposed close to and facing the upper fixed guide plate 22, and the upper fixed guide plate 22 is fixed to the lower mounting plate 21 by keeping prescribed clearance through a stay 23.

The diameter of this upper fixed guide plate 22 is made larger than that of the conical guide 17 found close to it at the upper position, to thereby guide the waste water coming up along the outer circumferential face of the conical guide 17 smoothly from the top end of the conical guide 17 toward the bottom face of the upper fixed guide plate 22, and further to the outside.

Still more, this upper fixed guide plate 22 is notched at the outer circumferential edge by the stays 23, 23. This notch 22a is made in triangular shape from the outer circumferential edge side at 4 points on the outer circumference of the disc at about 90 intervals, for example, though this is not particularly limitative, in such a way that the outer form takes the shape of a deformed cross, to make the falling shape of splashed water rectangular for adaptation to the shape of the sewage treating tank A. In that case, the length of the 4 protruding elements 22b, 22b formed by the notches 22a will be uniform, as shown in FIG. 8, when applied to a square sewage treating tank, but will be made longer on the side disposed facing the wall face of the sewage treating tank A closer to the aerator 1 and shorter on the side disposed facing the wall face of the sewage treating tank A away from the aerator 1, according to the shape of the sewage treating tank A, when applied to a rectangular sewage treating tank A.

The ratio of length of this protruding element 22b will be adjusted to the form of the sewage treating tank A in rectangular shape.

This makes it possible to make the waste water fall in a rectangular form, because the flying distance on the 2 wall faces of the sewage treating tank A closer to the aerator 1 installed at the center of the sewage treating tank A becomes small, and the flying distance on the 2 wall faces of the sewage treating tank A away from the aerator 1 becomes large. As a result, the splashed water falls uniformly in the neighbourhood of all wall faces, and the waste water is pushed down near the wall faces under this falling pressure, making it possible to not only increase the flow velocity of the waste water at corners including the bottom portion of the sewage treating tank A in rectangular shape but also control production of slewing current in the sewage treating tank A.

Moreover, the stay 23 supporting the upper fixed guide plate 22 has a blade-shaped or oval section, as shown in FIG. 7 and FIG. 8, and is fixed to the lower mounting plate 21 in a way to pass through the straightening block 20 provided on the lower mounting plate 21 as required.

Since the stay 23 is realized with a blade-shaped or oval section, when the waste water, coming up along the outer circumferential face of the conical guide 17 with the rotation of the upper agitating blade 13 and the conical guide 17, splashes to outside through the gap between the lower fastening plate 21 and the upper fastening guide 22, part of the waste water hits against this stay 23 and its direction of splash is changed, but the loss of energy by collision with this stay 23 can be minimized thanks to the blade-shaped or oval section of the latter.

In FIG. 8, the stay 23 is disposed in such a way that the longitudinal direction of the stay 23 becomes parallel, at a certain distance, to the 2 straight lines in perpendicular direction passing through the center of the upper fastening guide 22. By adjusting the mounting angle of this stay 23, it is possible to adjust the amount of splashing in the outer circumferential direction of the aerator 1.

Furthermore, the lower part of the upper fastening guide 22 is increased in size, to have different amounts of splashing of the waste water splashing through the gap between the lower fastening plate 21 and the upper fastening guide 22, at the top and the bottom of the gap, and to thus change the splashing distance of the waste water, for ensuring uniform spraying on the water surface in the sewage treating tank A.

Still more, a plate 24 may be disposed on the top face of the straightening block 20, to thereby adjust the direction of splashing and the amount of splashing of the waste water by applying a partial load to it.

Yet more, the shape of the upper agitating blade 13 and the lower agitating blade 14 may be decided as in the embodiment indicated in FIG. 3 but is not particularly restricted.

Figure 9:
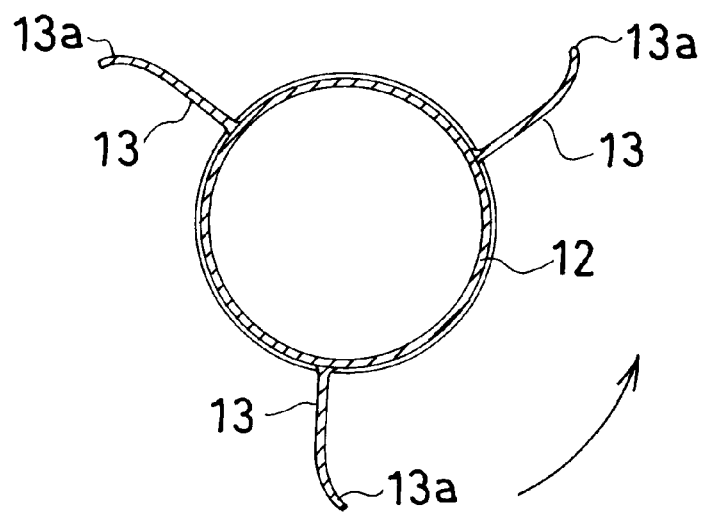
FIG. 9 is a transverse plan view of the upper agitating blade.

In addition, the outer edge 13a of the upper agitating blade 13 may be formed by being bent in the direction of rotation of the rotary shaft 12, as shown in FIG. 9. This eliminates any flow elements moving outward from the outer edge of the blade, prevents drop of aerating performance, because there is no increase of water leakage from the outer edge of the blade even if you increase the gap between the blade and the cylindrical body, and also makes it possible to prevent clogging of the cylindrical body due to catching of impurities between the blades and the cylindrical body, because a large gap can be set between the blade and the cylindrical body.

Explanation has so far been given on the aerator according to the present invention based on a plurality of embodiments, but the present invention is not limited to the constructions indicated in said embodiments, and its construction may be changed as required as far as it does not deviate from its purpose, by such means as combining the constructions indicated in the respective embodiments, etc. as required.

According to this aerator, realized in such a way that a cylindrical body disposed in a way to cover the area surrounding the rotary shaft is disposed from under the water surface to above the water surface and that the agitating blade is disposed by being split into upper agitating blade for sucking the waste water fed into the cylindrical body, during an aerobic operation, and lower agitating blade for feeding waste water into the cylindrical body, during an aerobic operation, and performing agitation by producing water current in the waste water, during an anaerobic operation, it is possible to feed waste water into the cylindrical body, with the upper agitating blade, by turning the rotary shaft rotatively driven by an electric motor in one direction, at the start of an aerobic operation, and also suck and splash the waste water fed into the cylindrical body like a fountain in the surrounding area, continuously thereafter, to feed air into the water so as to perform aerobic operation by aeration. In that case, in the normal state of aerobic operation, aerobic operation can be made with a power consumption about equal to that in the case where an upper agitating blade is disposed, even if a plurality of agitating blades are disposed.

On the other hand, during an anaerobic operation, agitation is made by producing water current in the waste water, with the lower agitating blade, by turning the rotary shaft in the opposite direction.

This makes it possible to obtain an aerator which is capable of performing aerobic operation feeding air into water, and anaerobic operation not feeding air into water efficiently, by simply switching the direction of rotation of an electric motor, without installing any lifting mechanism for lifting a rotary shaft provided with agitating blade, simple in construction, easy for maintenance control and highly reliable.

What is claimed is:

1. An aerator provided with an agitating blade mounted on a rotary shaft driven by an electric motor, and a cylindrical body disposed in such a way to cover the area surrounding said rotary shaft, characterized in that said cylindrical body is disposed both under and above the water's surface, and that said agitating blade is disposed by being split into an upper agitating blade for sucking up waste water fed into the cylindrical body during an aerobic operation, and a lower agitating blade for feeding waste water into the cylindrical body during an aerobic operation, and performing agitation by producing current in the waste water during an anaerobic operation.

2. An aerator as defined in claim 1, wherein the upper agitating blade is formed in the shape of a spiral tapered in diameter from the top toward the lower part.

3. An aerator as defined in claim 2, wherein the lower part of the upper agitating blade is formed into the shape of a spiral tapered in diameter from the top toward the lower part is formed with a uniform diameter over a prescribed length in the axial direction.

4. An aerator as defined in claim 1, wherein an intermediate agitating blade is disposed between the upper agitating blade and the lower agitating blade.

5. An aerator as defined in claim 1, wherein the outer edge of the upper agitating blade is formed by being bent in the direction of the rotary shaft's rotation.

6. An aerator as defined in claim 1, wherein the bottom end of the rotary shaft protrudes downward from the lower agitating blade, the bottom end face being formed in the shape of an arched face.

7. An aerator as defined in claim 1, wherein the lower fastening plate supporting the cylindrical body and the upper fastening guide disposed above the conical guide are connected to each other, through a stay having a blade-shaped or oval section.

8. An aerator as defined in claim 7, wherein the mounting angle of the stay is adjustable.

9. An aerator as defined in claim 1, wherein the electric motor is arranged in such a way to increase its speed only at the starting time.

* * * * *